(12) United States Patent
De Angelis et al.

(10) Patent No.: US 9,104,756 B2
(45) Date of Patent: Aug. 11, 2015

(54) CREATING HTML/CSS REPRESENTATIONS OF A GEOMETRIC SYMBOL

(75) Inventors: Rocco De Angelis, Schwalbach (DE); Vittorio De Angelis, Schwalbach-Hülzweiler (DE)

(73) Assignee: SOFTWARE AG, Darmstadt (DE)

( * ) Notice: Subject to any disclaimer, the term of this patent is extended or adjusted under 35 U.S.C. 154(b) by 804 days.

(21) Appl. No.: 13/339,850

(22) Filed: Dec. 29, 2011

(65) Prior Publication Data

US 2013/0167001 A1 Jun. 27, 2013

(30) Foreign Application Priority Data

Dec. 23, 2011 (EP) .................................... 11195595

(51) Int. Cl.
  *G06F 17/00* (2006.01)
  *G06F 17/30* (2006.01)
  *G06F 3/0481* (2013.01)
  *G06F 17/24* (2006.01)
  *G06F 17/21* (2006.01)
  *G06F 17/22* (2006.01)

(52) U.S. Cl.
  CPC ...... *G06F 17/30861* (2013.01); *G06F 3/04817* (2013.01); *G06F 17/211* (2013.01); *G06F 17/218* (2013.01); *G06F 17/227* (2013.01); *G06F 17/2247* (2013.01); *G06F 17/24* (2013.01); *G06F 17/248* (2013.01); *G06F 17/30805* (2013.01)

(58) Field of Classification Search
  CPC .............. G06F 17/2247; G06F 17/248; G06F 3/04817; G06F 17/30805; G06F 17/211; G06F 17/227; G06F 17/218; G06F 17/247

USPC .......... 715/838, 234–235, 272, 800–815, 763
See application file for complete search history.

(56) References Cited

U.S. PATENT DOCUMENTS

| | | | |
|---|---|---|---|
| 7,681,178 B1 * | 3/2010 | George et al. ................. | 717/117 |
| 2002/0054076 A1 | 5/2002 | Kim | |
| 2005/0160065 A1 * | 7/2005 | Seeman ........................... | 707/1 |
| 2005/0268216 A1 * | 12/2005 | Hayes et al. .................. | 715/505 |
| 2006/0059461 A1 * | 3/2006 | Baker et al. .................... | 717/113 |
| 2008/0077854 A1 * | 3/2008 | Alabi ............................. | 715/236 |
| 2008/0126380 A1 | 5/2008 | Lawe | |
| 2009/0063427 A1 * | 3/2009 | Zuta et al. ....................... | 707/3 |
| 2012/0030570 A1 * | 2/2012 | Migos .............................. | 715/702 |
| 2012/0079374 A1 * | 3/2012 | Gaddis ........................... | 715/269 |
| 2012/0079390 A1 * | 3/2012 | Ballagh et al. ................. | 715/738 |
| 2012/0266061 A1 * | 10/2012 | Williamson et al. .......... | 715/234 |

OTHER PUBLICATIONS

Search Report issued on Apr. 27, 2012 in corresponding European Application No. 11195595.1.
Elizabeth Gonzalez, "CSS-AFFN: A Datasheet Representation Model for Active Recognition Systems," Computer Analysis of Images and Patterns, Aug. 29, 2011, pp. 402-409.

\* cited by examiner

*Primary Examiner* — Quoc A Tran
(74) *Attorney, Agent, or Firm* — Nixon & Vanderhye, P.C.

(57) ABSTRACT

The invention relates to the creation of a HTML/CSS representation of a geometric symbol by processing (1000) a symbol definition from a file and by creating a web browser specific shape CSS class for each geometric shape (1080) comprised in the symbol definition. The generated HTML/CSS representation (1150) comprises the one or more created web browser specific CSS classes (1080, 1130).

15 Claims, 17 Drawing Sheets

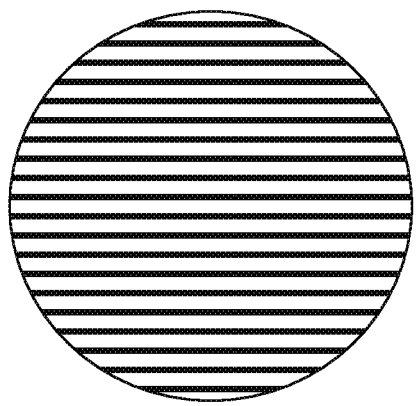 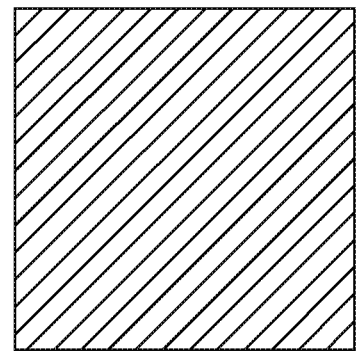
Fig. 5a  Fig. 5b
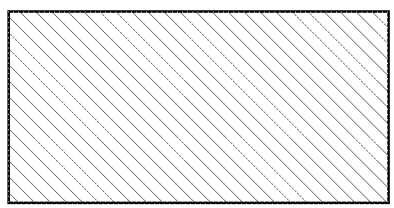 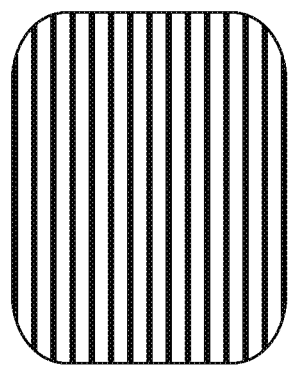
Fig. 5c  Fig. 5d

CREATING HTML/CSS REPRESENTATIONS OF A GEOMETRIC SYMBOL

This application claims priority to EP 11 195 595.1 filed 23 Dec. 2011, the entire contents of each of which are hereby incorporated by reference.

TECHNICAL FIELD

The present invention relates to a method and system for creating a HTML/CSS representation of a geometric symbol.

TECHNICAL BACKGROUND

Almost all modern enterprises use software tools for defining their internal and external processes. Such processes may for example relate to the various steps necessary for the assembly of a car but also to other tasks of an enterprise such as monitoring sales. To be able to define, monitor and evaluate a certain process or even the performance of the overall enterprise, a type of software referred to as Business Process Management (BPM) Tool is commonly used. One example of such a BPM Tool is the software ARIS available from applicant.

Figure 1:
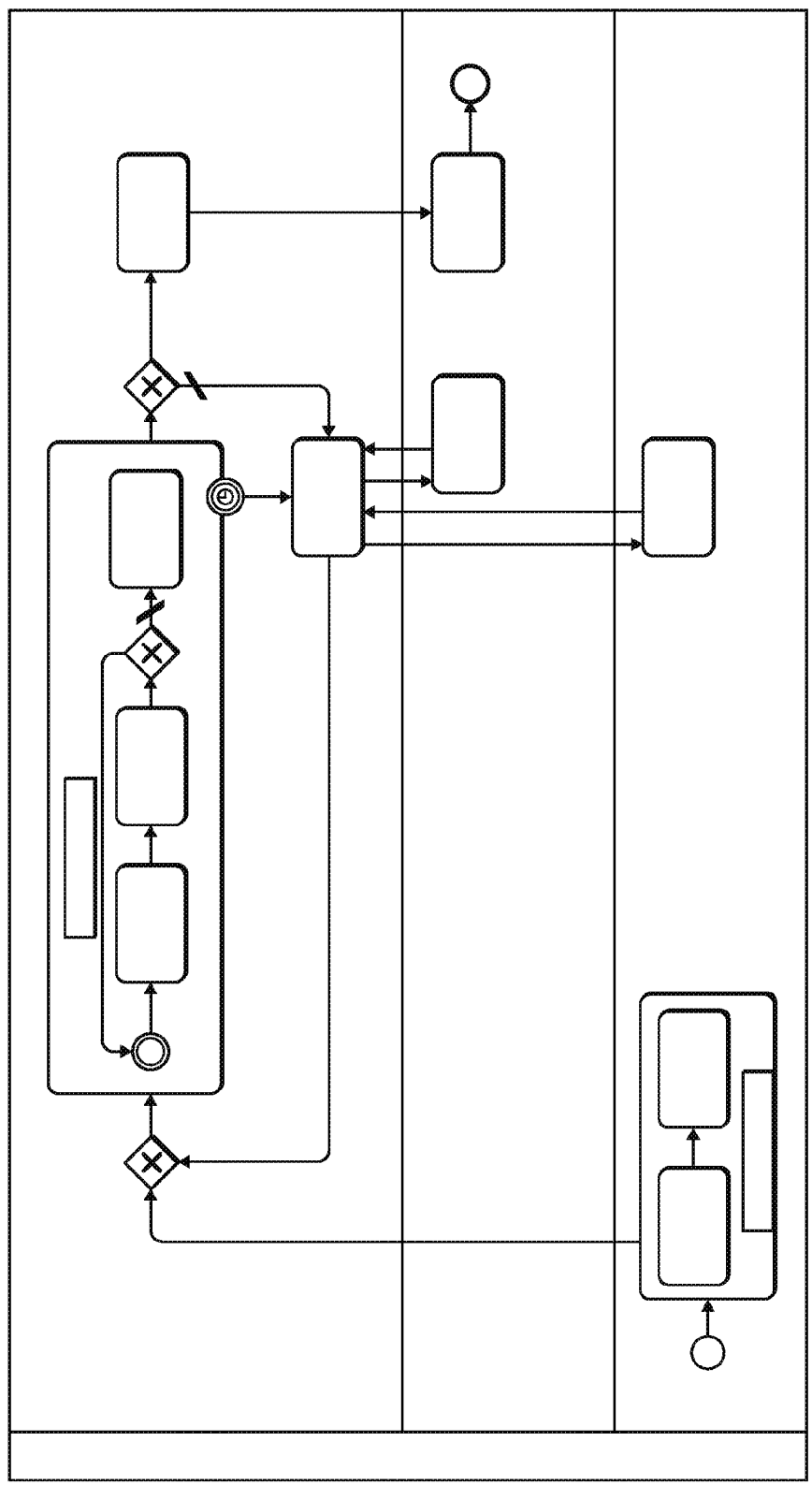

However, before implementing and using such a process it has to be defined. In order to simplify its definition, the various steps of a process to be developed are typically displayed in graphical form, e.g., using a flow diagram as illustrated in the screenshot of FIG. 1. Such flow diagrams can be created in various ways, e.g. manually or by drawing on a computer using a professional drawing program. However, such an approach is rather complex and inflexible. A more convenient option of creating such a flow diagram is using a web browser, e.g, by building a corresponding HTML file.

There are several ways to employ a web browser for creating flow diagrams which are briefly outlined in the following:

A first option is to use a third party plug-in such as Adobe Flash. However, such a plug-in typically requires a lot of computing power and may not be available on all platforms.

Figure 2:
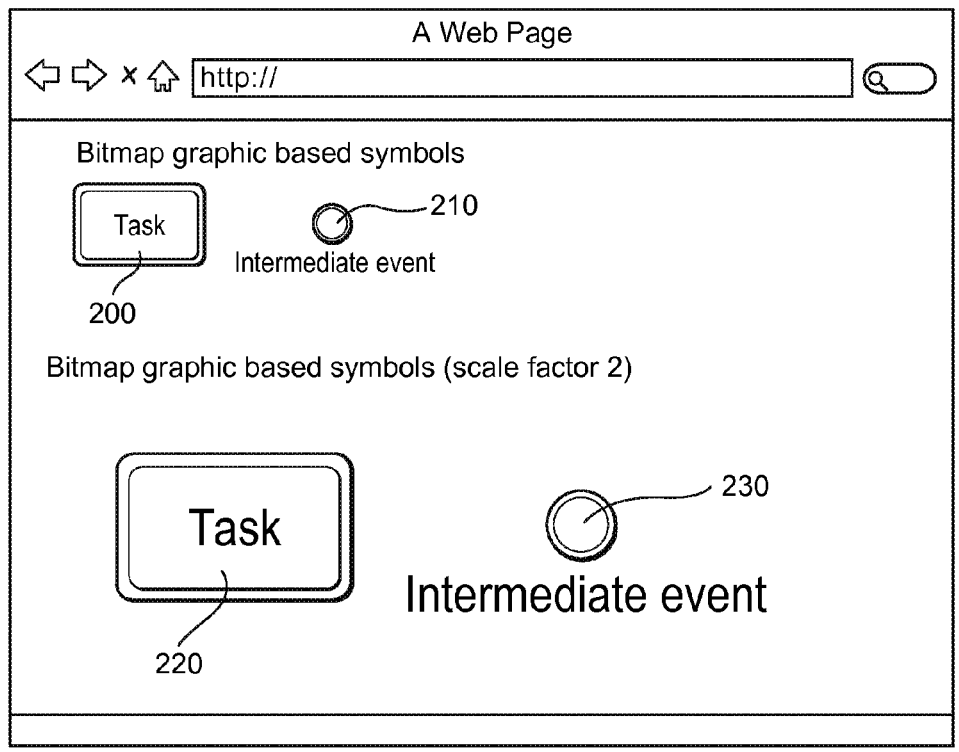

Another option is using bitmap based graphics, wherein a bitmap represents a symbol based on web graphic formats like PNG or JPEG. Such a technology is used in products like Signavio or BPMN Community. However, bitmap based formats cannot be scaled without losing quality. This is illustrated in FIG. 2: Symbols 200 and 210 are bitmap graphic based symbols which are displayed at original size. Symbols 220 and 230 show the same symbols, however scaled by a factor of 2. As can be seen, the scaling results in visible artifacts and thus in reduced quality.

Figure 3:
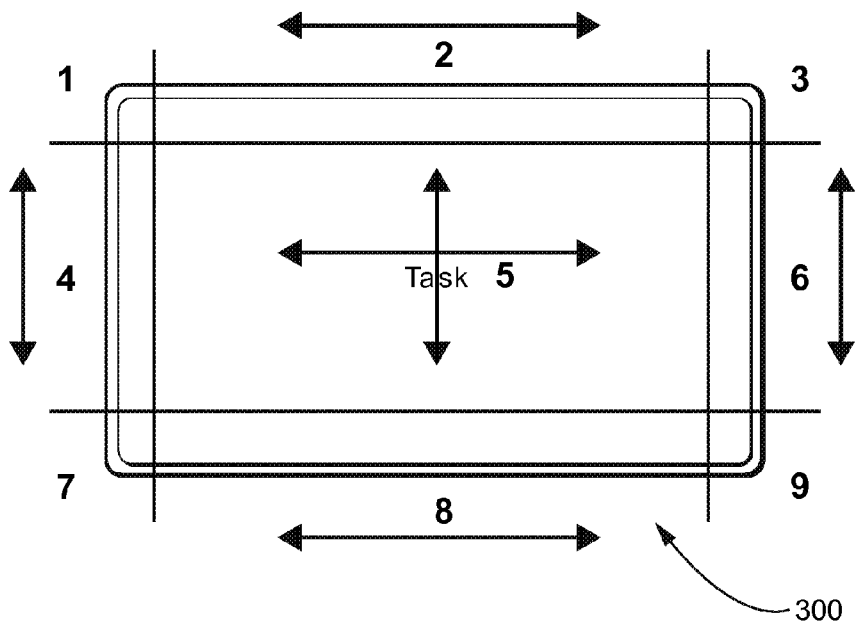

Another approach is known as 9 slice scaling graphics. This technology is for example used by IBM Blueworks Live. The idea behind this approach is to split each graphic or symbol into 9 slices, i.e., different graphics so that the various region of the overall graphic can be independently scaled. As shown in FIG. 3, the regions 1, 3, 7 and 9 will never be scaled regardless of whether the graphic 300 will be stretched horizontally or vertically. If the graphic 300 is horizontally scaled, only the regions 2 and 8 will be stretched. If the graphic 300 is vertically scaled, the regions 4 and 6 will be stretched. The region 5 will always be stretched. This approach has the benefit that graphics that have a plain solid colored region in the center can be scaled without losing quality. However, this approach does not work with arbitrary shapes.

Another well-known approach is using vector based graphics, wherein a graphic is formatted in a web browser supported format like SVG or VML. This is another technology used by the BPM Tools of Signavio. Vector based graphics can be indefinitely scaled without degrading quality. However, vector formats like SVG and VML need a high amount of memory and a lot of processing power to render large and complex SVG and VML structures.

Figure 4:
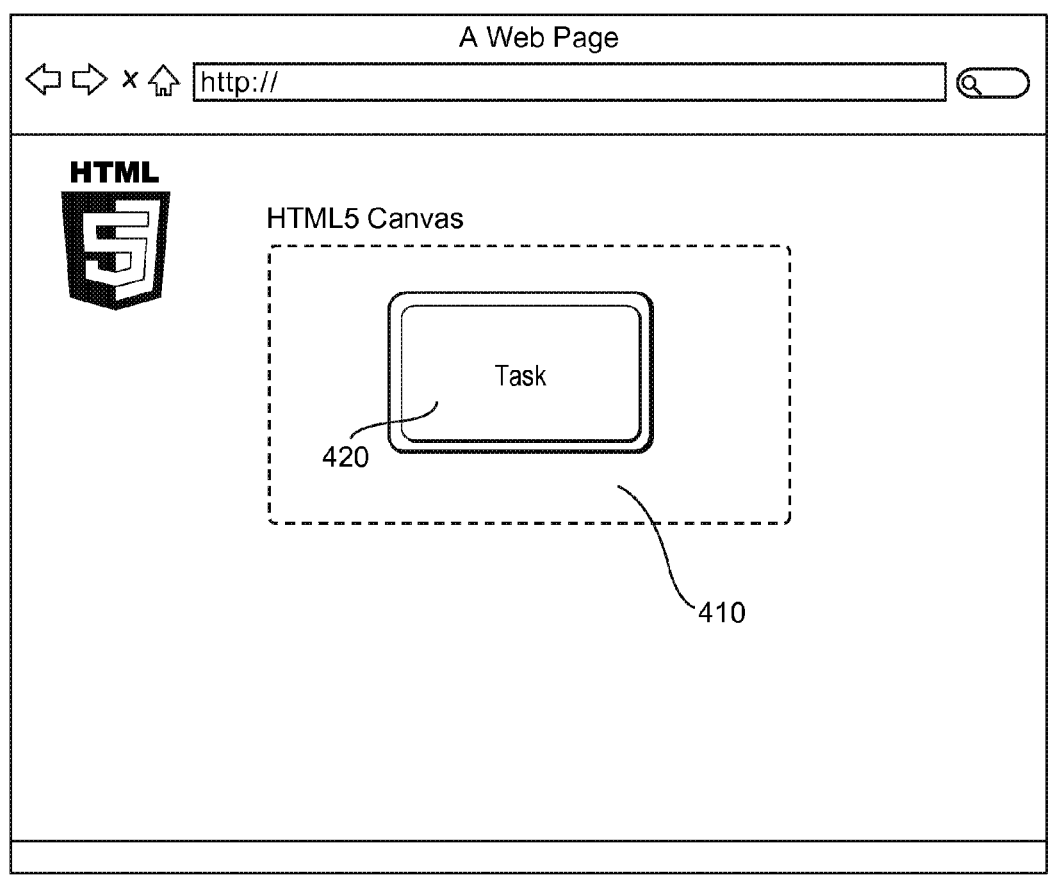

A further option is to draw a symbol in the web browser by using the HTML5 Canvas API (Application Programming Interface). This technology is for example used by Lucidchart or WebSphere Business Compass. As illustrated in FIG. 4, the HTML5 Canvas API allows to draw any kind of symbol 420 onto a canvas 410 in the web browser. Most common web browsers today already support a GPU (Graphics Processor Unit) acceleration for the HTML5 Canvas API but the performance to calculate the symbol geometry and to draw a symbol is still unsatisfactory.

A more recent approach is to use HTML5 and CSS3 (Cascading Style Sheets), which is also a technology used by IBM Blueworks Live. Following this approach, a symbol is represented by various nested HTML elements which are styled with CSSs. This technique can be combined with any of the other approaches described above, in particular the 9 slice scaling graphics. Most common web browsers support a GPU accelerated CSS rendering leading to an acceptable performance of representing a symbol as a HTML fragment styled with CSS compared to the other solutions. However, it is rather difficult for human persons to create a complex symbol based on a HTML fragment and to style it with CSS. In addition, some common web browsers fail to support the complete CSS standard so that different CSS notations are necessary to obtain the same or similar results.

It is therefore the technical problem underlying the present invention to provide a solution that reduces the necessary effort for programming such graphics, in particular in view of the different web browsers, and to make such code more reliable and stable.

SUMMARY OF THE INVENTION

In one embodiment this problem is solved by a method for creating a HTML/CSS representation of a geometric symbol, wherein the method comprises:
a. processing a symbol definition from a file;
b. creating a web browser specific shape CSS class for each geometric shape comprised in the symbol definition; and
c. generating a HTML symbol comprising the one or more created web browser specific CSS classes.

By using a definition of the geometric symbol written in a format that is easier to understand than a convoluted combination of HTML/CSS the effort needed for creating such a symbol can be greatly reduced. Writing code in an appropriate language (e.g., XML or JSON) is easier than writing code directly in a combination of HTML and CSS. This is particularly the case if a certain geometric symbol has a complex structure and comprises several shapes, such as a square with several circles, wherein each circle has different line colors and color gradients.

In one exemplary embodiment, the method further comprises the creation of at least one web browser specific attribute CSS class for each of the geometric shapes.

Thereby geometric shapes may be separated by putting them into different CSS classes. By creating not only a CSS shape class, but also a CSS attribute class it is possible to separate the shape and specific attributes of the geometric symbol. Therefore, less code is needed, since equal geometric shapes can use the same CSS code. Only the respective attributes, e.g., color or size may be stored separately in the attribute CSS classes. The CSS files can then be combined to build a common HTML/CSS representation of the geometric symbol.

As already mentioned above, different web browsers support HTML and CSS in different ways so that the respective HTML and CSS files must fulfill certain requirements depending on the web browser. The invention allows building of web browser specific CSS classes so as to optimize the display of the symbols. However, a web browser specific class may also be compatible to several (e.g., the most common) web browsers. For instance, if two or more web browsers support some CSS code in the same way, they may be grouped to form a first web browser specific CSS class, while for other web browsers a second CSS class is generated.

Preferably, the method comprises the additional step of determining the level of CSS support of the web browser and the step of adjusting the creation of the web browser specific CSS classes accordingly.

As mentioned above, there is a wide variety of different standards and versions of standards which makes the correct display of information more complex. Moreover, different web browsers typically interpret commands in a different way which may also lead to different results. Thus, by determining the level of CSS support of the web browser and consequently by adjusting the creation of web browser specific CSS classes accordingly, it is possible to tune the resulting HTML/CSS representation such that it can be optimally processed and displayed by the respective web browser. As mentioned above, it may be the case that several web browsers support certain CSS code in a similar way, which would result in web browser specific classes suited for several web browsers.

It is preferred that the web browser specific shape CSS class is created from a generic shape CSS class.

The creation of a generic shape CSS class can serve as basis for the generation of various web browser specific shape CSS classes. Thus, it is not necessary to re-create the basic information required for creating the web browser specific shape CSS classes but the existing generic shape CSS class can be re-used. This feature further increases the efficiency of the generation of the HTML/CSS representation.

It is also preferred that the step of creating the at least one web browser specific attribute CSS class further comprises the step of determining equal attributes for each of the shapes and the step of merging the equal attributes into a generic attribute CSS class.

This feature may even further reduce the amount of the code. Even different geometric shapes (e.g., circle, triangle and square) may share at least some attributes (e.g., color of the lines or line width etc.). By grouping these attributes in a single CSS class the code needs to be present only once and may be called several times. Consequently, the amount of code can be reduced compared to the standard solution which does not teach such a determination and merging step.

Preferably, the web browser specific attribute CSS class is created from the generic attribute CSS class.

This feature allows to start from the generic class and to produce multiple different web browser specific classes without the need to re-create the basic information necessary to generate web browser specific attribute CSS classes. This aspect is similar to the above discussed generation of web browser specific shape CSS classes and has similar advantages.

It is preferred that the step of generating the HTML/CSS representation comprises the generation of the HTML/CSS representations for a set of pre-defined web browsers and storing the set of HTML/CSS representations into a single file.

As mentioned before, different web browsers may interpret code differently. This may lead to different visual representations of a symbol even though the same code is used. To overcome such problems a set of web browsers may be pre-defined in order to create a number of HTML/CSS representations at once. As a result, the web browser can select the correct version of the HTML/CSS representation, e.g., based on a tag comprised in the file and therefore display the symbol as originally intended by the creator of the symbol.

Preferably, the symbol definition is provided in a XML-compatible format.

The XML standard serves as a basis for nearly all web based standards, e.g., HTML or CSS. Thus, by using such basic and well-known standard the creation of complex symbols can be improved. Moreover, the XML is human readable and easily understandable, in particular when compared to complex programming languages. Consequently, symbols defined in XML (or a similar language) can not only be easier understood but also be quickly modified and even without any knowledge of complex programming languages.

In a preferred embodiment, the HTML/CSS representation comprises a HTML file which comprises the web browser specific CSS classes.

It may be desired to pre-produce a symbol for a wide variety of web browsers. In this case, one option is to build a single HTML/CSS representation, e.g., a file, which comprises symbols according to the web browser specific classes. The web browser could then determine which of a number of symbols to use in order to correctly display the symbol. In particular, the user may not have to determine which version of the file to use. This could be done by the web browser, e.g., based on a tag comprised in the code of the respective HTML/CSS representations.

The invention may also be implemented by a computer program comprising instructions for causing at least one computer to perform a method according to any of the above described embodiments.

The invention may also be realized by a system for creating a HTML/CSS representation of a geometric symbol, wherein the system comprises:

a. a processing module adapted to process a symbol definition from a file;
b. a creation module adapted to create a web browser specific shape CSS class for each geometric shape comprised in the symbol definition; and
c. a generation module adapted to generate the HTML/CSS representation comprising the one or more created web browser specific CSS classes.

Further dependent claims are described in the detailed description of the invention.

SHORT DESCRIPTION OF THE FIGURES

Figure 6:
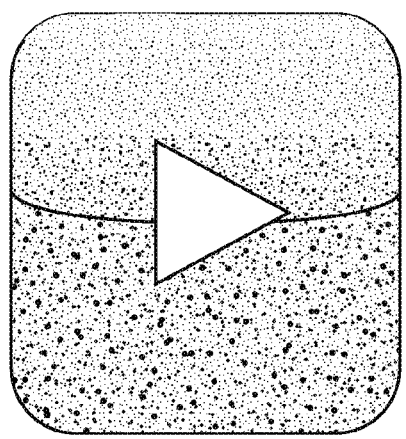
Figure 7:
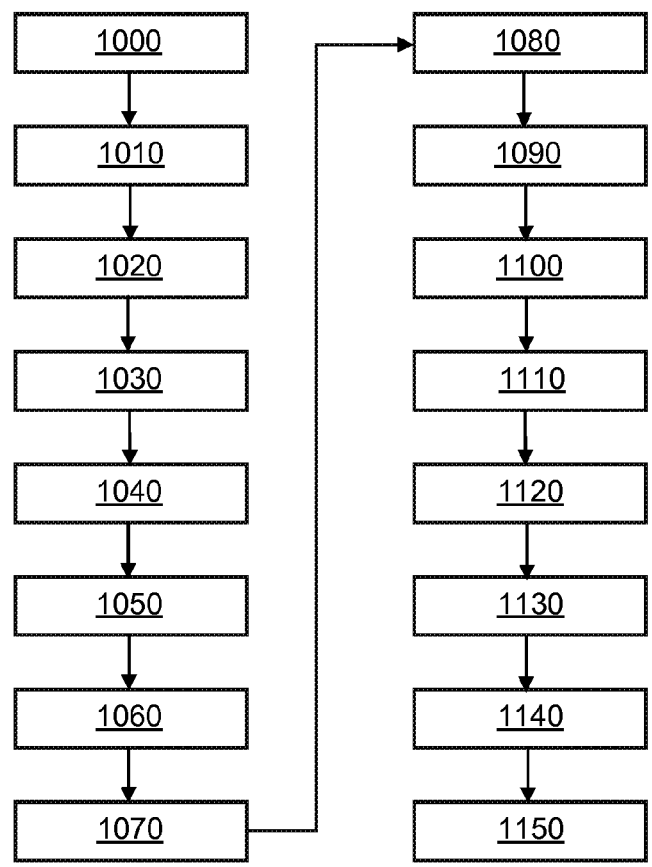
Figure 8A:
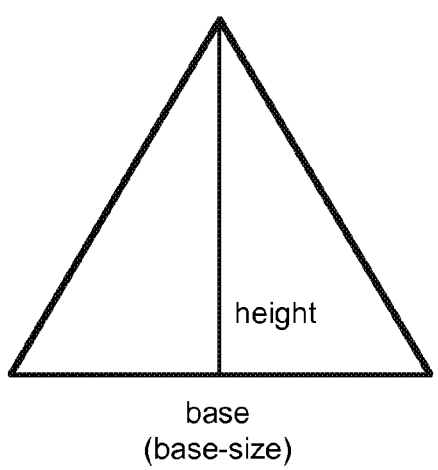
Figure 8B:
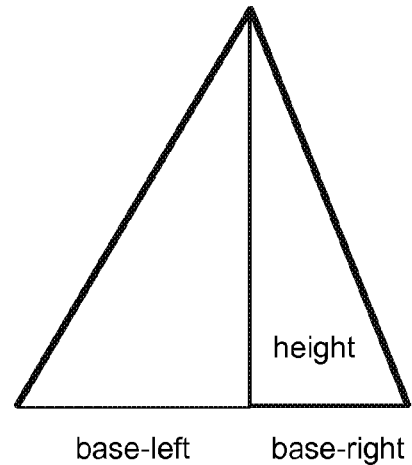
Figure 9A:
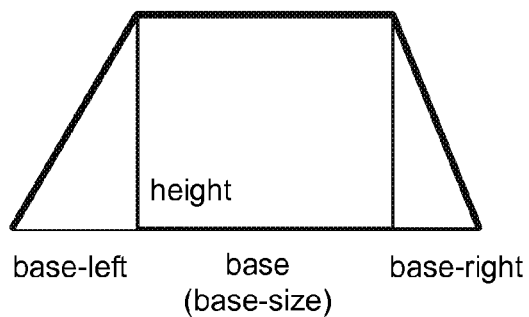
Figure 9B:
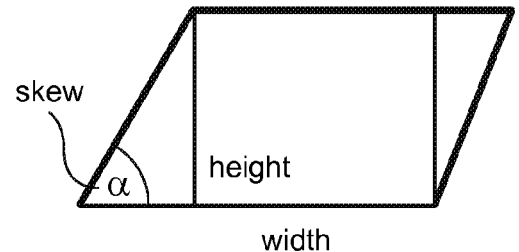
Figure 10:
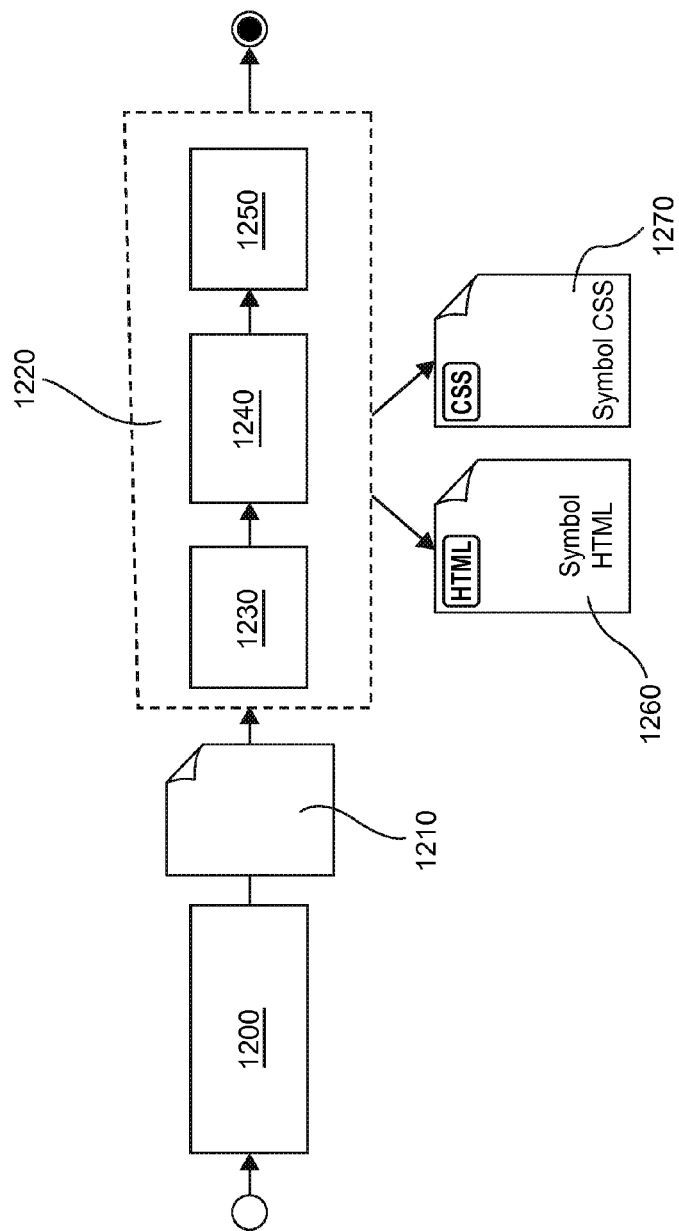
Figure 11:
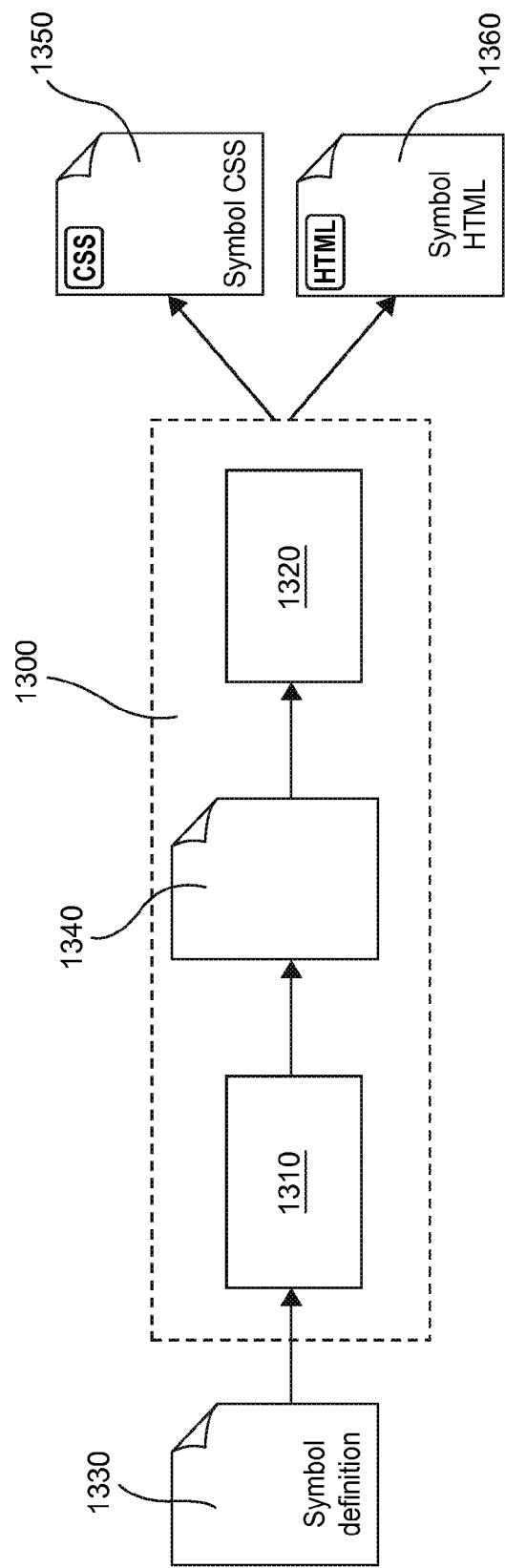
Figure 12:
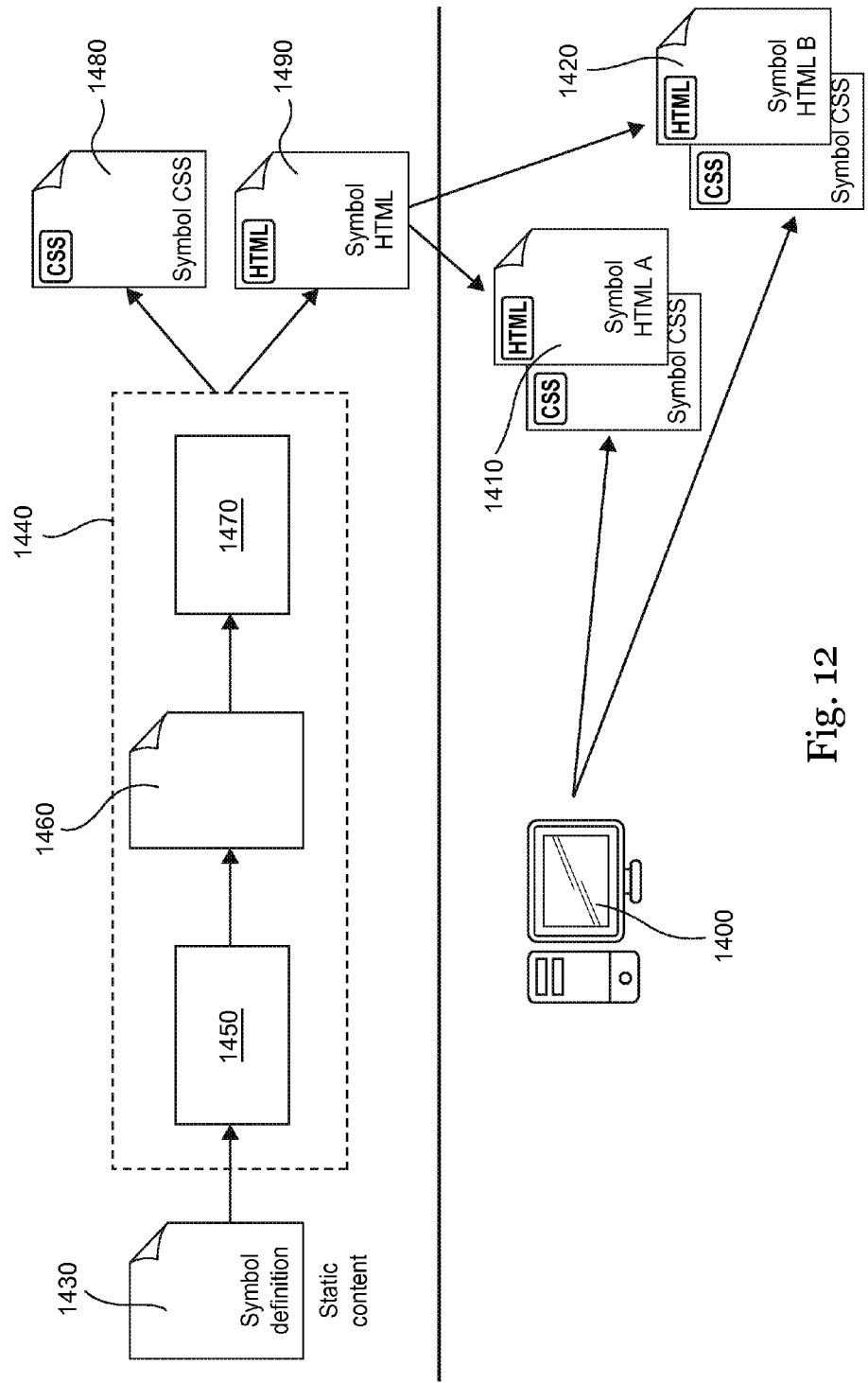
Figure 13:
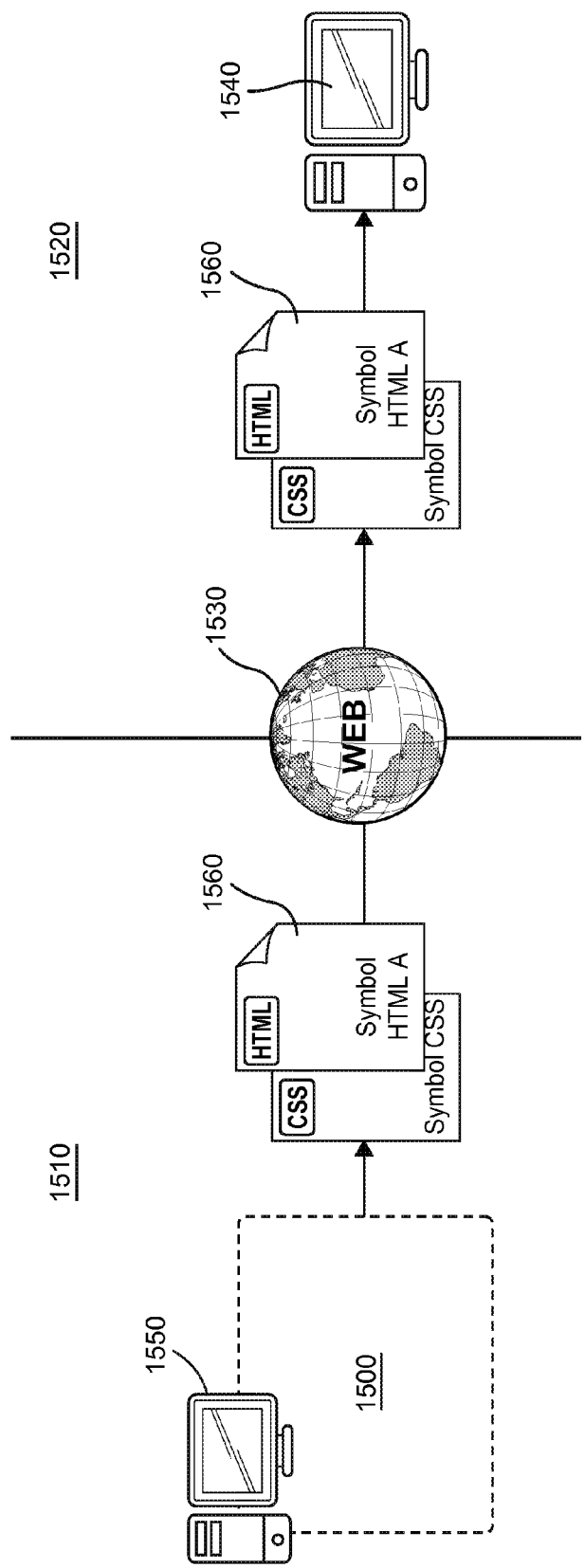
Figure 14:
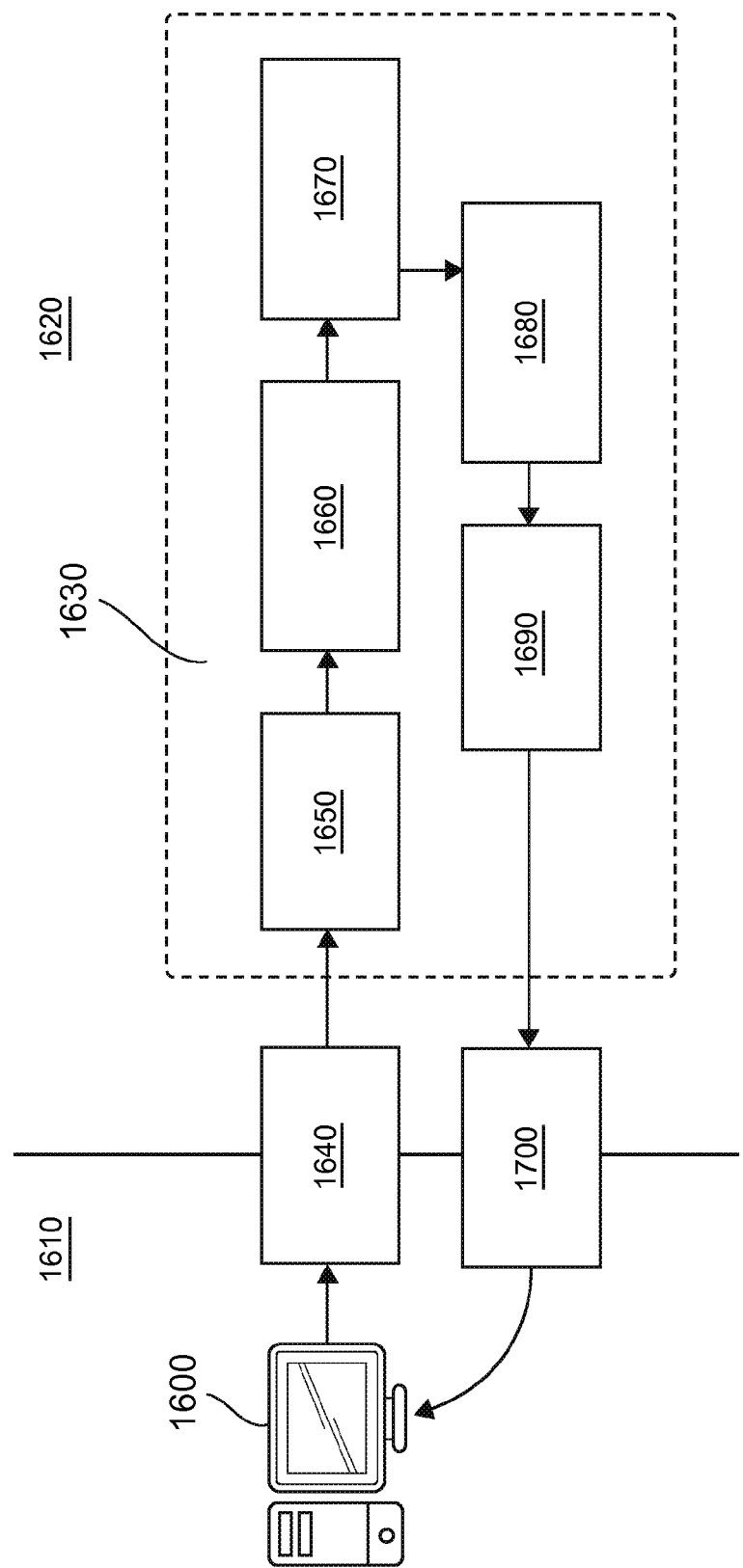
Figure 15:
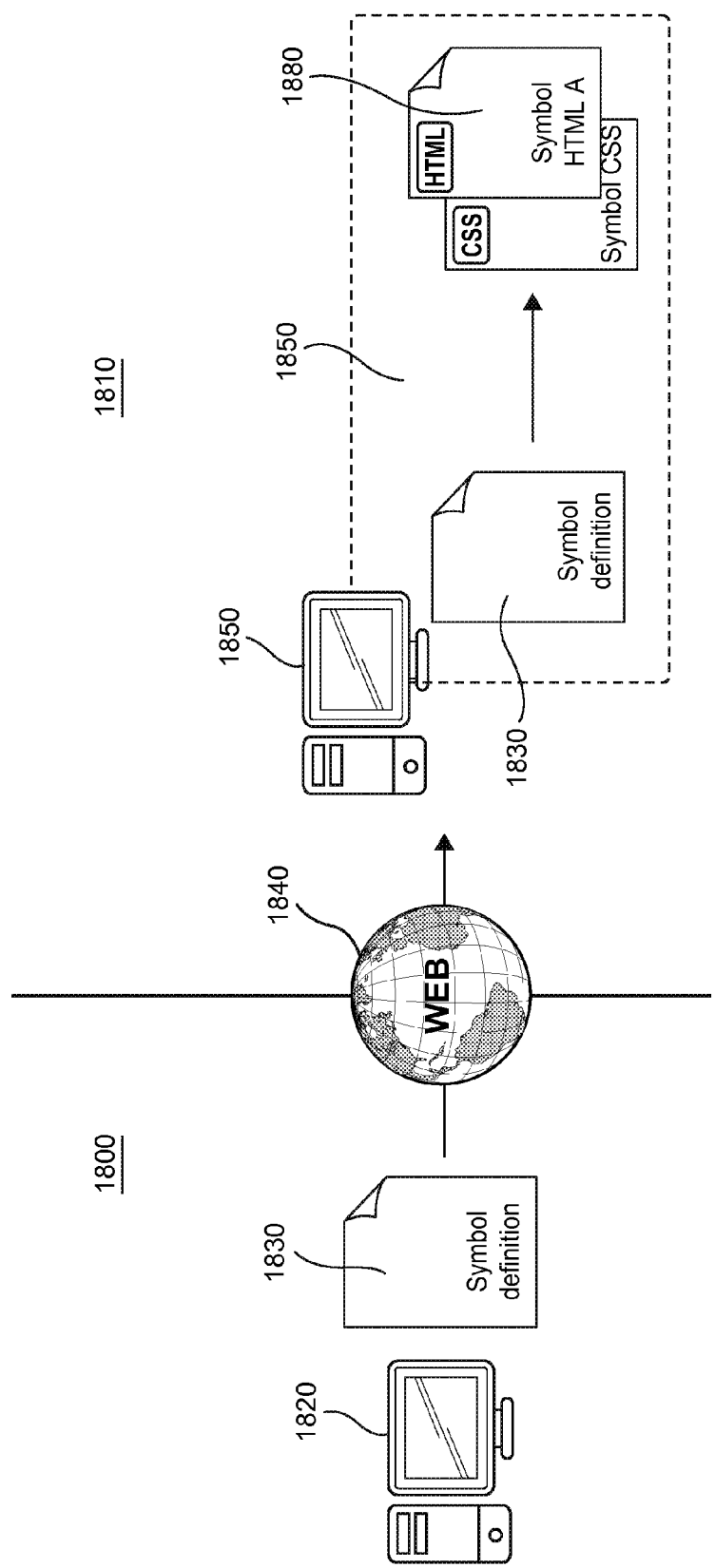
Figure 16:
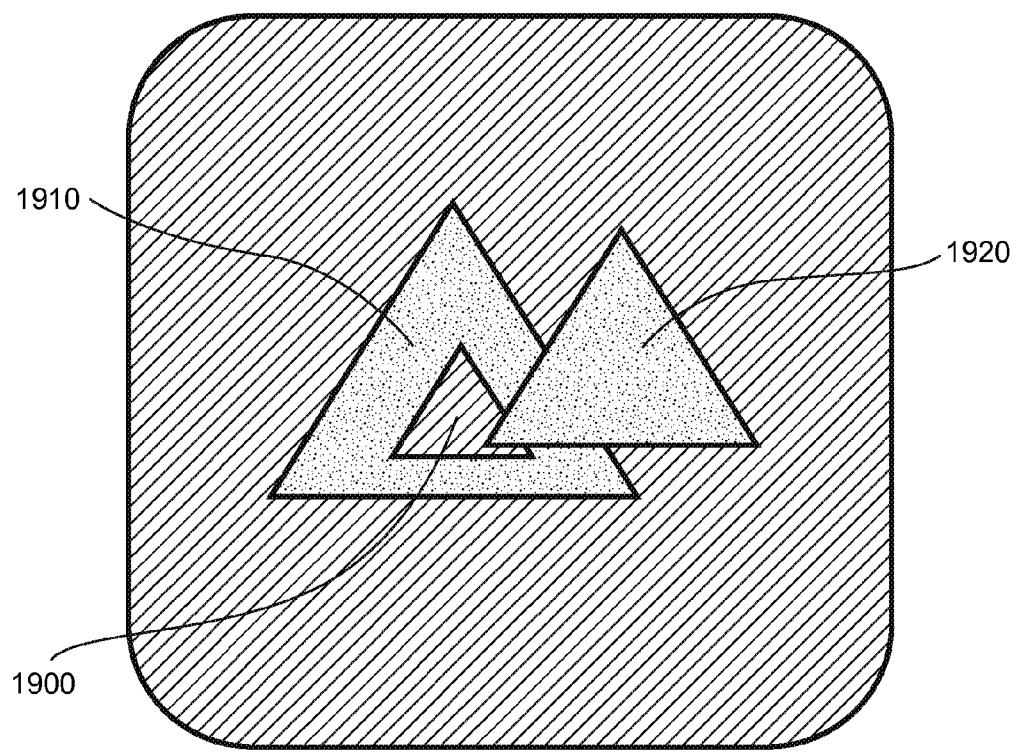
Figure 17:
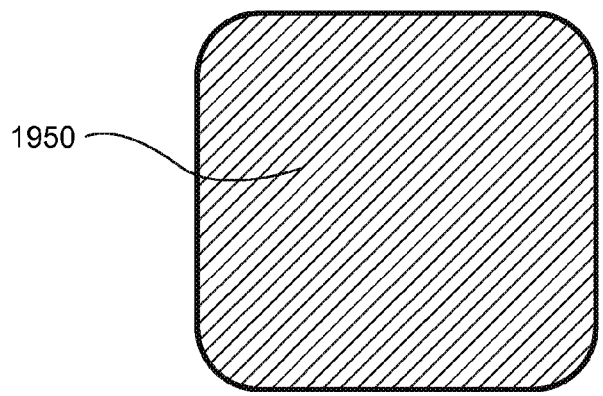
Figure 18:
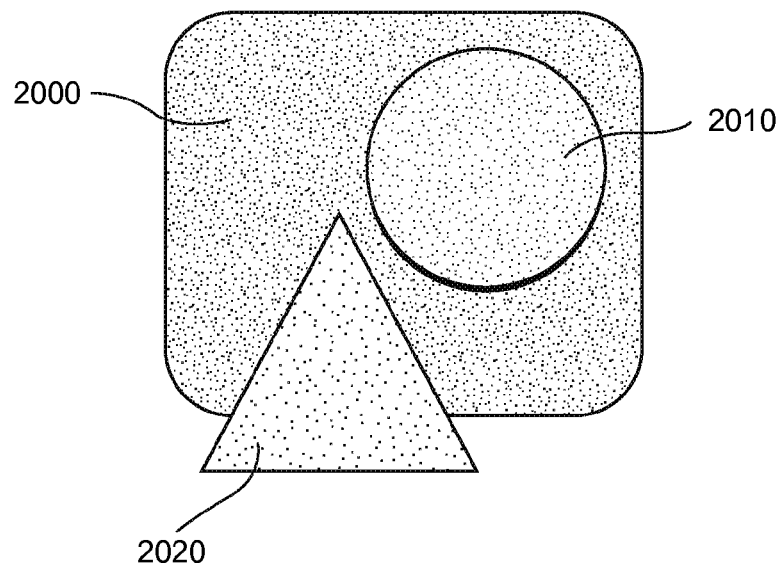
Figure 19:
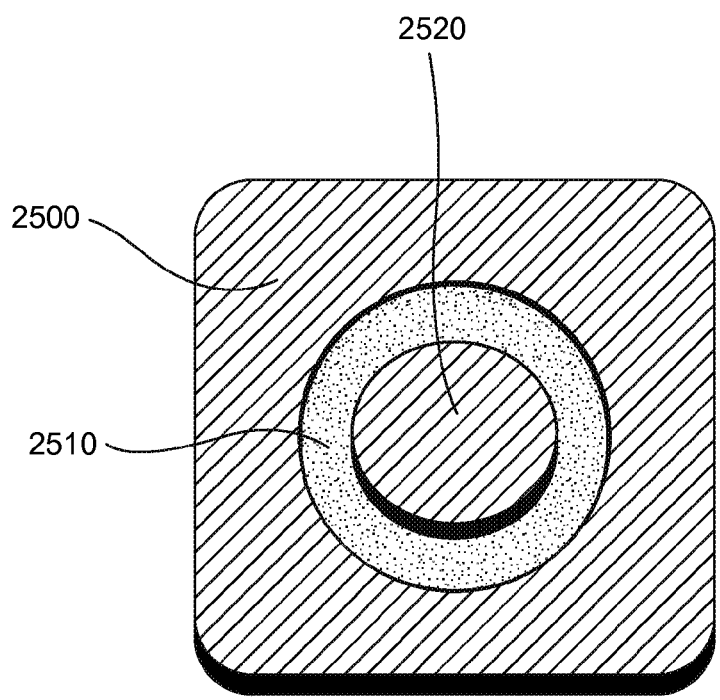
Figure 20:
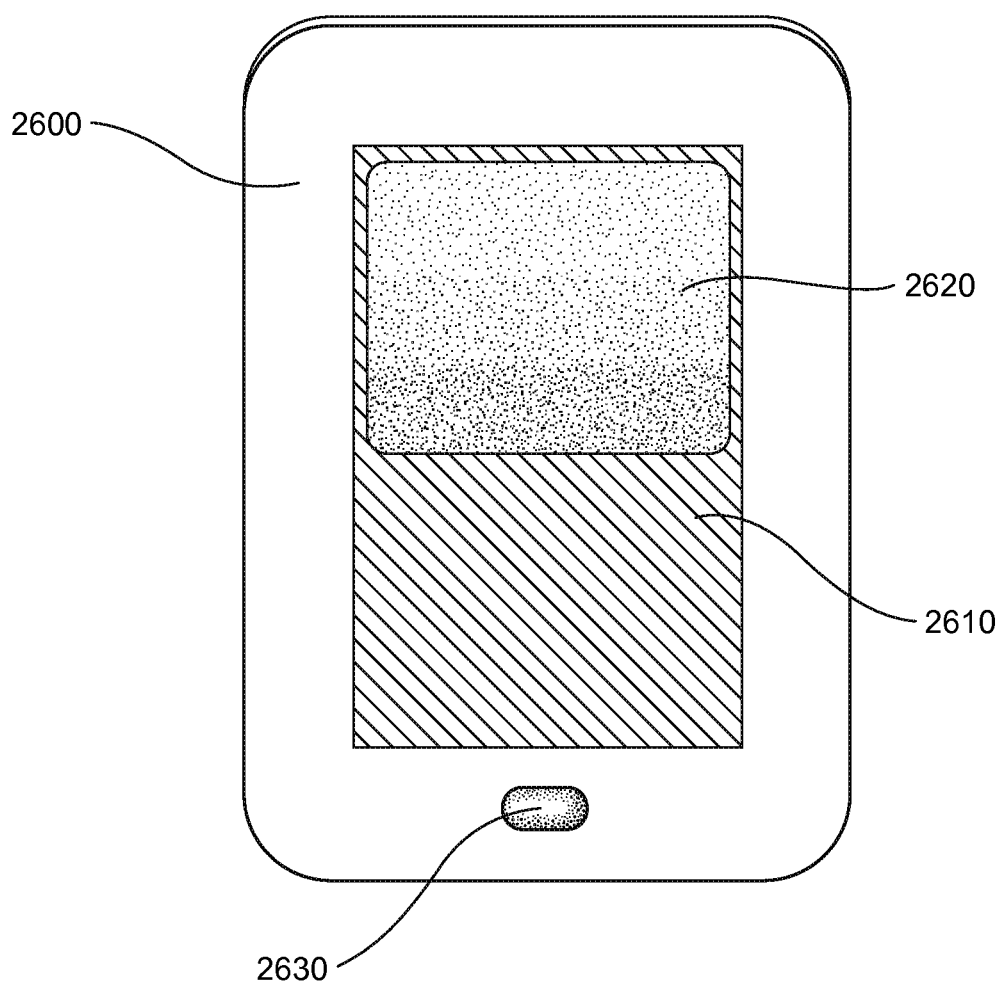

In the following detailed description, presently preferred embodiments of the invention are further described with reference to the following figures, wherein the figures show:

FIG. 1: an example of a process flow model comprising different symbols having different shapes and attributes (prior art);

FIG. 2: the effect of scaling bitmap graphic based symbols (prior art);

FIG. 3: the so-called 9 slice method for scaling symbols (prior art);

FIG. 4: an example of web browser side rendering with HTML5 canvas (prior art);

FIG. 5*a-i*: examples of various shapes that could be defined in CSS in accordance with an embodiment of the present invention;

FIG. 6: an example of a complex symbol;

FIG. 7: a flow diagram illustrating the transformation of a symbol (e.g., defined in XML) into a HTML/CSS representation in accordance with an embodiment of the present invention;

FIG. 8*a-b*: example definitions of triangles in accordance with an embodiment of the present invention;

FIG. 9*a-b*: example definitions of trapezia in accordance with an embodiment of the present invention;

FIG. 10: the workflow for the transformation of a symbol into a HTML/CSS representation in accordance with an embodiment of the present invention;

FIG. 11: components of the transformation framework in accordance with an embodiment of the present invention;

FIG. 12: an illustration of the transformation framework as decoupled system in accordance with an embodiment of the present invention;

FIG. 13: an illustration of the transformation framework when integrated on server side in accordance with an embodiment of the present invention;

FIG. 14: an illustration of the cross-browser support in accordance with an embodiment of the present invention;

FIG. 15: an illustration of the transformation framework when integrated on client side in accordance with an embodiment of the present invention;

FIG. 16: an illustration of a complex symbol comprising three triangles;

FIG. 17: an illustration of a rounded square with background color;

FIG. 18: an illustration of a complex figure comprising a rounded square, a triangle and a circle, sharing the same color gradient;

FIG. 19: an example of a simple symbol in accordance with an embodiment of the present invention;

FIG. 20: an example of a tablet computer symbol in accordance with an embodiment of the present invention.

DETAILED DESCRIPTION OF THE FIGURES

As already mentioned in the introduction, one of the main disadvantages of the known HTML/CSS approach is the complexity of a HTML fragment and the one or more CSS styles. This is particularly problematic if these fragments and styles are created manually. In any case, the code has to be correct so that the created symbol will be correctly rendered in the different web browsers. The idea of the present invention is to represent a graphical symbol as a HTML fragment and to style it with CSS in a more efficient way than known from prior art. This is achieved by creating the symbol in a simpler, human understandable and generic language such as XML, SVG or comparable languages and to transform it into an HTML/CSS representation in an efficient manner. The user does not need to have any knowledge about HTML and CSS.

For reasons of simplicity, the description mostly refers to a single symbol in a file that is to be processed. However, it is clear that also any number of symbols could be comprised within a single input file which is then generated into a HTML/CSS representation. This allows to generate even more complex HTML/CSS representations based on a single input file which is written in human-readable language. Different symbols comprised in a single file could also make use of the various features and embodiments described herein, e.g., the merging of shapes and/or attributes.

With reference to FIGS. 5*a* to 5*i* several basic CSS based geometric shapes are exemplarily shown. It is to be understood that the following list of geometric shapes is by no means intended to restrict the number of possible geometric shapes. They are intended to provide an overview over some common geometric shapes and CSS representations thereof. The following CSS styles can be applied to a single <div> element to obtain the corresponding shape.

FIG. 5*a* shows a circle which could be represented by the following CSS code:

```
#circle {
  width: 140px;
  height: 140px;
  background: red;
  -moz-border-radius: 70px;
  -webkit-border-radius: 70px;
  border-radius: 70px;
}
```

Another basic geometric shape is a square as shown in FIG. 5*b*, and which could be represented by the following CSS code:

```
#square {
  width: 140px;
  height: 140px;
  background: blue;
}
```

A similar geometric shape is a rectangle. An example of a rectangle is shown in FIG. 5*c*. This shape could be represented by the following code:

```
#rectangle {
  width: 140px;
  height: 80px;
  background: green;
}
```

A rounded square as shown in FIG. 5*d* is another basic geometric shape that is typically used in flow diagrams. A rounded square could be represented by the following code:

```
#rounded_square {
  width: 100px;
  height: 100px;
  background-color:#344567;
  -moz-border-radius:20px;
  -webkit-border-radius: 20px;
  border-radius: 20px;;
}
```

Figure 5E:
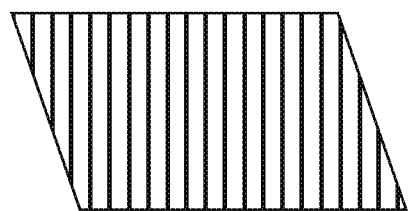
Figure 5F:
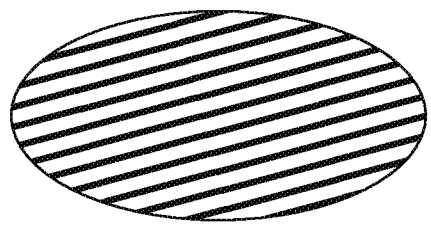
Figure 5G:
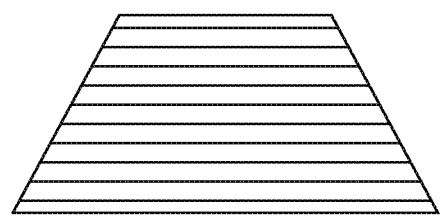

A parallelogram such as that exemplarily shown in FIG. 5*e* may be represented by the following code:

```
#parallelogram {
  width: 130px;
  height: 75px;
  background: pink;
  /* Skew */
  -webkit-transform: skew(20deg);
  -moz-transform: skew(20deg);
  -o-transform: skew(20deg);
  transform: skew(20deg);
}
```

An oval is another shape regularly used in flow diagrams. The shape could be represented by the following code:

```
#oval {
width: 200px;
height: 100px;
background: purple;
-moz-border-radius: 100px / 50px;
-webkit-border-radius: 100px / 50px;
border-radius: 100px / 50px;
}
```

Trapezia are also typically used in flow diagrams. An example of a trapezium illustrated in FIG. 5g. It could be represented by the following code:

```
#trapezium {
height: 0;
width: 80px;
border-bottom: 80px solid blue;
border-left: 40px solid transparent;
border-right: 40px solid transparent;
}
```

Figure 5H:
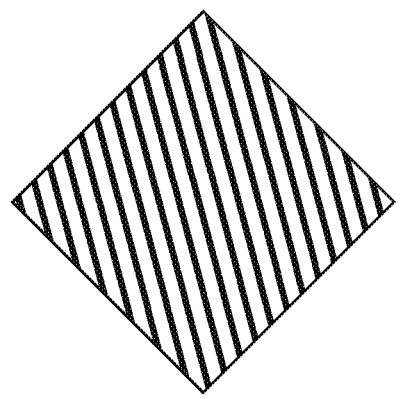

Another typical geometric shape is a diamond, shown in FIG. 5h. This diamond could be represented by the following code:

```
#diamond {
width: 80px;
height: 80px;
background: purple;
margin: 3px 0 0 30px;
-webkit-transform: rotate(-45deg);
-moz-transform: rotate(-45deg);
-ms-transform: rotate(-45deg);
-o-transform: rotate(-45deg);
transform: rotate(-45deg);
-webkit-transform-origin: 0 100%;
-moz-transform-origin: 0 100%;
-ms-transform-origin: 0 100%;
-o-transform-origin: 0 100%;
transform-origin: 0 100%;
}
```

Figure 5I:
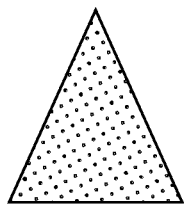
Figure 5I:
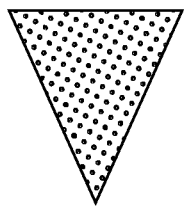
Figure 5I:
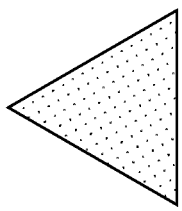
Figure 5I:
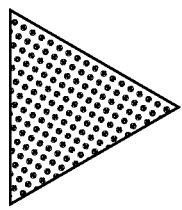

A further geometric shape is a triangle. FIG. 5i illustrates triangles with different orientation (up, down, left and right), which could be represented by the following code:

```
#up-triangle {
width: 0;
height: 0;
border-bottom: 120px solid green;
border-left: 60px solid transparent;
border-right: 60px solid transparent;
}
#down-triangle {
width: 0;
height: 0;
border-top: 80px solid pink;
border-left: 60px solid transparent;
border-right: 60px solid transparent;
}
#left-triangle {
width: 0;
height: 0;
border-right: 100px solid orange;
border-top: 50px solid transparent;
border-bottom: 50px solid transparent;
}
#right-triangle {
width: 0;
height: 0;
border-left: 100px solid red;
border-top: 50px solid transparent;
border-bottom: 50px solid transparent;
}
```

All of the above explained basic geometric shapes can be rotated, translated and may also be combined to form complex symbols. Further, CSS supports shadows and transparency. In addition, it is also possible to fill the various geometric shapes with different color gradients as well as with images. Generally, the invention may use all features that are provided by CSS, even if they are not explicitly mentioned herein. This makes it possible to create very complex symbols.

While the above shapes are quite simple, FIG. 6 illustrates an example for a complex symbol and the HTML/CSS code necessary for creating that symbol. As can be seen, the required code is quite complex and therefore error-prone. In more detail, the example of FIG. 6 is composed of the following 3 shapes: A rounded rectangle which is the base shape of the symbol, the triangle in the middle of the symbol and a shape used to display the glass effect of the symbol. Writing manually a CSS/HTML definition for the symbol will end up in at least 3 <div> elements (one for each shape) and 3 more complex CSS style definitions defining the appearance for each shape (e.g., size, colors, shadows).

```
<html>
<head>
<title>>Test</title>
<style>
.ExampleSymbol {
padding:0px;
width: 176px;
height: 176px;
background: -webkit-gradient(linear, 0% 0%, 0% 100%,
from(#2D9DCD), to(#00B6F1), color-stop(.5,#004DE4));
display: inline-block;
color: #fff;
text-decoration: none;
-moz-border-radius: 30px;
-webkit-border-radius: 30px;
-moz-box-shadow: 0 1px 3px rgba(0,0,0,0.6);
-webkit-box-shadow: 0 1px 3px rgba(0,0,0,0.6);
text-shadow: 0 -1px 1px rgba(0,0,0,0.25);
border-bottom: 1px solid rgba(0,0,0,0.25);
position: relative;
}
.glossy {
background: -webkit-gradient(linear, 0% 0%, 0% 100%,
from(rgba(255, 255, 255, 0.8)), to(rgba(255, 255,
255, 0.2)));
height: 90px;
width: 176px;
position: relative;
-webkit-border-top-right-radius: 38px;
-webkit-border-top-left-radius: 38px;
-webkit-border-bottom-right-radius: 120px 20px;
-webkit-border-bottom-left-radius: 100px 20px;
z-index: 3;
-webkit-box-shadow: inset 0px 2px 1px #fff;
border-top-right-radius: 38px 38px;
border-top-left-radius: 38px 38px;
border-bottom-right-radius: 120px 20px;
border-bottom-left-radius: 100px 20px;
}
.right-triangle {
width: 0;
height: 0;
border-left: 60px solid white;
```

-continued

```
border-top: 30px solid transparent;
border-bottom: 30px solid transparent;
position: relative;
left:65px;
top:55px;
}
</style>
</head>
<body>
<div class="ExampleSymbol">
<div class="glossy"/>
<div class="right-triangle"/>
</div>
</body>
</html>
```

The invention provides a framework which allows a human person or even a computer system to describe symbols such as shown in FIG. 6 in a humanized language which, according to an embodiment of the present invention, may then be transformed by the transformation framework into a cross-browser HTML 5/CSS 3 code. This results in the general ability of the code to support all common web browsers.

In one embodiment, the present invention may be divided in three parts, which will be described in more detail in the following: the transformation framework, the definition language and the symbol editor. However, this does not imply that all parts are essential to realize the invention.

The transformation framework may be considered as core of the invention. In one embodiment, the transformation framework could be implemented as a piece of computer code implementing the main logic and a language processor adapted to transform a given humanized definition language into a cross-browser HTML 5/CSS 3 code. However, other versions of the standards may also be used.

A preferred embodiment of the transformation framework will now be described with reference to FIG. 7. However, not all of the following steps may be necessary in all embodiments of the present invention.

In step 1000, the XML symbol definition is processed from a file and then parsed into an in-memory data structure representing the defined model. The in-memory data structure may be a binary representation of the XML code. In step 1010, the symbol is broken down into its individual geometric shapes. In step 1020, the geometric shapes used to form the symbol are determined. As example, it may be determined that the XML symbol comprises squares, triangles and circles.

In step 1030, a HTML <div> element is created which will represent the whole symbol. Further, for each shape a nested <div> element is created. In HTML a <div> tag defines a division or section in an HTML document. For the <div> elements only the size and the position are defined directly in the <div> element. All other styling information is assigned using one or more CSS classes.

In step 1040, for each (different) geometric shape (e.g. rectangle, triangle or circle) a generic CSS class is created and assigned to the corresponding <div> element. If the symbol definition comprises a certain geometric shape more than once there is still only one CSS class created for this geometric shape. For example, if a XML symbol comprises two squares, only one CSS class for squares will be created. This class is also referred to as CSS shape class. This approach reduces the amount of code of the generated CSS class. The generic CSS class contains only CSS styles which can be interpreted by all supported browsers. In general, the CSS support of different web browsers is well documented so that it is easy to create a kind of knowledge base for the framework. This could be a XML document containing for each supported web browser and one or more versions corresponding to the CSS support, information on how to display the different shape types and the supported effects in that web browser.

In step 1050, the target platform (e.g., the specific web browser type) for the symbol is determined. In step 1060, the supported CSS level as well as the web browser specific CSS support is determined.

In step 1070, a specific CSS generation engine is instantiated to generate the web browser specific CSS code based on the information determined in the previous step. As mentioned above, different web browsers may interpret commands in a different way which could result in a different display of the geometric shape or even in errors when displaying the geometric shape. It is therefore desirable to adjust the creation of the CSS shape classes to one or more specific web browsers. In step 1080, a web browser specific shape CSS class is generated for each geometric shape. In step 1090, the generated CSS classes are assigned to the corresponding <div> elements.

In step 1100, the defined shape attributes are analyzed to determine shapes with the same attribute type and value. In step 1100, the frameworks merges as many as possible of the attribute types/values into one CSS attribute class which can be assigned later to several shapes. In other words, if several shapes use at least in part the same attribute type with the same value, this style information will be put in the same CSS attribute class, step 1110. For instance, the transformation framework could find two rectangles which both have the same border color, the same border width and the same opacity. In this case, this style information is put in one CSS attribute class which is then assigned to the <div> elements of both rectangles.

In step 1120 the CSS code is again broken down into two parts: in a generic CSS code which can be interpreted by all supported web browsers and in one part which depends on the target web browser. In step 1130, the (target) web browser specific CSS code for the shape attributes defining the style of the geometric shape is created. In step 1140, the generated shape CSS classes are assigned to the corresponding <div> elements.

Finally, in step 1150, the generated HTML symbol code (HTML and CSS) is written out as the final HTML/CSS representation.

The definition language as it may be used herein in accordance with an embodiment of the present invention may be XML or DOM (Document Object Model) based. Other implementations of the symbol language, e.g., based on JSON are also possible. Such a description allows a human person or system to describe in a humanized way a complex figure or symbol. In this context, the term "humanized" means that the language makes use of common, well known and speaking terms to describe a complex figure or symbol. The definition language may also allow to make use of common vector graphic languages which may be XML or text-based. Such text-based-vector languages may be SVG, VML or EPS. In a so-called mixed-mode, the definition document may comprise embedded parts describing parts of the symbol by one or more of those text-based vector languages. The usage of those text-based vector languages is restricted by the possibilities to describe shapes using the HTML/CSS definition language.

The following reference gives an overview of an example definition language which is based on XML. It should be mentioned that the below definitions are by no means intended to limit the invention to these definitions. It is also possible to extend the language with new elements and attributes as desired and required by the person skilled in the art.

Symbol-Element:

```
<symbol>
Content: [<shape> | <image> | <line> | <text>]*
</symbol>
```

Shape-Element:

```
<shape
width := <size>,
height := <size>,
x := <pixel>,
y := <pixel>,
rotate := <rotation>
scale := <scale>
fill := [<color> | <gradient> | <url>] ,
shadow := <shadow>
glow := <glow>
glossy:= <glossy>
opacity := [0 .. 100]
border := <color>,
border-width := <length>
Content: [<shape> | <image> | <line> | <text>]*
</shape>
Shape =: oval, rectangle, triangle, parallelogram, trapezium
```

Rectangle-Element:

The rectangle element extends the shape element with following attributes:

```
<rectangle
border-radius := [(<length>, <length>)] {1,4},
sticky-note-style := [true | false]
card-style := [true | false]
embossed-style := [true | false]
soft-embossed-style := [true | false]
cutout-style := [true | false]
>
Content: [<shape> | <image> | <line> | <text>]*
</rectangle>
```

Oval/Ellipse-Element:

The oval element extends the shape element with following attributes:

```
<ellipse
radius-x := <size>
radius-y := <size>
sticky-note-style := [true | false]
card-style := [true | false]
embossed-style := [true | false]
soft-embossed-style := [true | false]
cutout-Style := [true | false]
>
Content: (<shape> | <image> | <line> | <text>)*
</ellipse>
```

For the ellipse element the 'width' and 'height' attributes of the shape may be ignored.

Triangle-Element:

The triangle element extends the shape element with following attributes:

```
<triangle
base-size := <size>
base-left := <size>
base-right := <size>
card-style := [true | false]
embossed-style := [true | false]
soft-embossed-style := [true | false]
cutout-Style := [true | false]
>
Content: (<shape> | <image> | <line> | <text>)*
</ triangle>
```

For the triangle element the 'width' attribute of the shape might be ignored. FIGS. 8a (isosceles triangle) and 8b (scalene triangle) illustrate how the triangle may be defined according to an embodiment.

Trapezium-Element:

The trapezium element extends the shape element with following attributes:

```
<trapezium
base-size := <size>
base-left := <size>
base-right := <size>
card-style := [true | false]
embossed-style := [true | false]
soft-embossed-style := [true | false]
cutout-Style := [true | false]
>
Content: (<shape> | <image> | <line> | <text>)*
</ trapezium >
```

For the trapezium element the 'width' attribute of the shape might be ignored.

Parallelogram-Element:

The parallelogram element extends the shape element with following attributes:

```
<parallelogram
base-size := <size>
base-left := <size>
base-right := <size>
skew:= <length>
card-style := [true | false]
embossed-style := [true | false]
soft-embossed-style := [true | false]
cutout-Style := [true | false]
>
Content: (<shape> | <image> | <line> | <text>)*
</ parallelogram >
```

FIGS. 9a (simple definition) and 9b (extended definition) illustrate how the parallelogram could be defined.

Circle-Element:

The circle element extends the shape element with following attributes:

```
<cirlcle
radius:= <size>
card-style := [true | false]
embossed-style := [true | false]
```

```
soft-embossed-style := [true | false]
cutout-Style := [true | false]
>
Content: (<shape> | <image> | <line> | <text>)*
</ circle >
```

For the circle element the 'width' and 'height' attribute of the shape may be ignored.

Diamond-Element:

The diamond element extends the shape element with following attributes:

```
<diamond
card-style := [true | false]
embossed-style := [true | false]
soft-embossed-style := [true | false]
cutout-Style := [true | false]
>
Content: (<shape> | <image> | <line> | <text>)*
</ diamond >
```

Line-Element:

```
<line
sx := <length>,
sy := <length>,
tx := <length>,
ty := <length>,
fill := [<color> | <gradient> | <url>],
line-width := <pixel>,
rotate := <rotation>,
shadows:= <shadows>
>
</line>
```

Text-Element:

```
<text
height := <size>,
rotate := <rotation>,
embossing := [true | flase],
fill := [<color> | <gradient> | <url>] ,
shadows:= <shadows>,
glow := <glow>,
glossy:= <glossy>,
border := <color>,
opacity := [0 .. 100]
>
Content: string
</text>
```

Image-Element:

```
<image
src := <url>;
height := <size>,
width := <size>,
rotate := <rotation>,
opacity := [0 .. 100],
border := <color>,
border-width := <length>,
shadows:= <shadows>,
glow := <glow>,
glossy:= <glossy>
>
</image>
```

Attribute Type Definition:

```
size := < length > | <percent>
length:= integer px
percent := [0 .. 100] %
rotation := [-]? [0 .. 180]
color := rgba (<red, green, blue, alpha>)
red := [0 .. 255]
green := [0 .. 255]
blue := [0 .. 255]
alpha := [0 .. 255]
shadows := (<shadow>) [ , (<shadow>) ]*
shadow := <length> <color>
glow := <length> <color>
glossy := <color> <glossy-style>
glossy-style := [simple | rounded ]
gradient := gradient(<gradient-start>, <gradient-
stop>, <gradient-start-color>, <gradient-stop-color>)
gradient-start-color := <color>
gradient-stop-color := <color>
gradient-start := start(< gradient-point>)
gradient-stop := stop(< gradient-point>)
gradient-point := [left | right | middle], [top |
bottom | middle]
```

Now the symbol editor will be described in more detail. The symbol editor can be a GUI (Graphical User Interface) which allows the user to draw complex symbols without any knowledge about the symbol definition language. The symbol editor will create as output a symbol definition (e.g., in XML-compatible language) which can then be transformed into a HTML/CSS figure by utilizing the transformation framework. However, in one embodiment the symbol may also be defined using any other suitable means, e.g., a text based editor.

FIG. 10 illustrates the complete transformation workflow in accordance with an embodiment of the present invention. In step 1200 the user creates a symbol definition 1210. This could be done using the symbol editor (e.g., the GUI mentioned above) or by creating the symbol definition manually, e.g., using a text editor or a web browser or by using a third party system. In the following, the symbol definition 1210 is interpreted by the transformation framework 1220 (one embodiment thereof has been described above with reference to FIG. 7) and transformed in a programming object model. In step 1230 the symbol definition is processed. Then, the transformation framework 1220 creates optimized HTML and CSS code, step 1240. In the last step 1250 the HTML code 1260 and CSS code 1270 are written out. The HTML/CSS representation could be written into a single file or distributed over several files. The steps performed by the transformation framework 1220 can be executed automatically, or semi-automatically. For instance, the user may interact with the transformation framework 1220 in order to confirm the generation of the HTML/CSS representation for a specific browser.

FIG. 11 is an overview about the different components of the transformation framework 1300 according to a preferred embodiment of the present invention and shows how these components may interact with each other. The main components of the transformation framework 1300 are the symbol interpreter 1310 and the symbol generator 1320.

The symbol interpreter 1310 is responsible for parsing the symbol definition 1330 and for creating an in-memory structure 1340 representing the symbol. As mentioned above, the in-memory structure may be binary. The generated data structure 1340 is the input for the main transformation algorithm which is implemented in the symbol generator 1320. The symbol generator 1320 implements the algorithm to transform a symbol from a human readable definition (e.g., XML) into a HTML and CSS based representation. The symbol generator 1320 is also responsible for optimizing the CSS structure 1350 and HTML structure 1360 and to make it cross browser compliant.

According to another embodiment of the present invention, the transformation framework is not part of the running system making use of the output generated by the transformation framework. The transformation framework is only used for a one-time generation of the HTML symbol description. This scenario is illustrated in FIG. 12 which shows the transformation framework as a decoupled system. Therein, an external system 1400 uses the HTML/CSS representations 1410, 1420 of symbols which it retrieves, e.g., over a network. The network may be any type of network known in the art. In particular, it could be a wired network or a wireless network or a combination thereof. The transformation of the symbol definition occurs at a remote location and in accordance with the embodiments described above. In more detail, the transformation framework 1440 comprises the symbol interpreter 1450 and the symbol generator 1470. The symbol interpreter 1450 generates a symbol data structure 1460 based on symbol definition 1430, which is then processed by symbol generator 1470 to produce a cross browser compatible HMTL/CSS representation 1480, 1490. In this scenario, the already generated symbols (e.g., HTML and CSS files, which is the output of the symbol generator) may be located on a web server and are requested by a HTTP request from the client. The generator is not used during runtime.

In one embodiment, the code might run either on a server (e.g., web/application server) or a client side (e.g., web browser). In a client-server web scenario as illustrated in FIG. 13, the transformation framework 1500 is an integrated component of the system. This means, the system makes use of the transformation framework 1500 during the application runtime. In this scenario the transformation framework 1500 can be integrated either on the server 1510 or on the client (web browser) side 1520. The figures below illustrate an embodiment of this scenario. The client 1520 and server 1510 may communicate via a network 1530 utilizing various types of communication means. For instance, the client 1520 and server 1510 may communicate via the World Wide Web, wherein the client 1520 runs a web browser 1540 and communicates with the web server 1550 on the server side 1510 which provides the transformation framework 1500. In the depicted embodiment, the web server 1550 which comprises the transformation framework 1500 sends the HTML/CSS representation 1560 via the network 1530 to the web browser 1540.

In this scenario it is also possible to use hard or soft permutations (however, the hard and/or soft permutations could also be used in any other embodiment of the present invention). In the hard permutations scenario the transformation creates different HTML/CSS files for each supported web browser. On runtime the web browser type is determined and the corresponding symbol file is then sent to the client. In the soft permutations scenario the transformation framework will create only one HTML/CSS file, i.e., one HTML file and one CSS file. which will work on each supported web browser. However, it is also conceivable that only a single file may be created. In the soft permutations case the generated file will be much larger and needs much more time to be transferred to the client. If hard permutations are used, the web browser type and CSS support might be determined during runtime.

This is also illustrated by FIG. 14, wherein via a web browser 1600 on the client side 1610 a HTML symbol is requested 1640 from the server 1620. The request is retrieved by transformation framework 1630 which then processes the request. In step 1650, the transformation framework 1630 processes and analyzes the symbol definition. Subsequently, the type of the requesting web browser and the CSS support are determined, step 1660. To this end, the web browser may use the HTTP protocol to request data like HTML pages or CSS files from the server. The header of a HTTP request message contains a field named "user agent" (see http://tools.ietf.org/html/rfc1945#section-10.15) used by the communication partners to characterize the client and to optionally select suitable content. Thereafter, the CSS configuration engine can be configured, step 1670, which then generates optimized HTML/CSS symbol code, step 1680. As a result, the generated HTML/CSS code is written out, step 1690 and finally the transformation framework 1630 may provide (directly or indirectly) the web browser 1600 with the request response, step 1700, i.e., with the requested HTML/CSS representation of the symbol.

However, according to a preferred embodiment of the present invention it is also possible to perform the transformation on the client side, which is illustrated in FIG. 15. Therein, a server 1800, e.g., a web server 1820 may send a symbol definition 1830, e.g., via the World Wide Web 1840 (or any other suitable communications means known to the person skilled in the art) to a client 1810. This client could comprise a web browser 1850 which runs the transformation framework 1860. However, the transformation 1860 framework may not be directly integrated into the web browser. In this case, the web browser would call the transformation framework 1860. The transformation framework 1860 then generates the HTML/CSS representation 1880 of the symbol definition 1830 received from the web server 1820. Finally, the web browser 1850 may utilize the generated HTML/CSS representation in order to display the retrieved symbol definition. In this way, the amount of data to be transmitted can be kept relatively low since the web browser 1850 creates the HTML/CSS representation itself. It is not necessary to transmit a set of HTML/CSS representations from which the web browser then has to select a suitable HTML/CSS representation.

The following section provides some examples of symbols which can be created with the transformation framework in accordance with any of the embodiments of the present invention as described above.

The shape of FIG. 16 comprises three triangles 1900, 1910 and 1920. Triangles 1910 and 1920 share the same border colors, while triangle 1900 has different border colors. However, the triangles are derived from a single CSS class, which may be represented by the following code:

```
triangle {
    width: 0;
    height: 0;
    border-bottom: 120px solid green;
    border-left: 60px solid transparent;
    border-right: 60px solid transparent;
}
```

Some of the attributes of the triangles 1900, 1910 and 1920 are necessary for all triangles, while some attributes differ, e.g., size or color. For the triangles depicted in FIG. 16, this results in six CSS classes:

This is the most general CSS class comprising attributes shared by all triangles 1900, 1910 and 1920:

```
triangle {
    width: 0;
    height: 0;}
```

The following code represents the colors of triangle 1900:

```
#triangle-style02 {
    border-bottom: solid red;
    border-left: solid transparent;
    border-right: solid transparent;}
```

The following code represents the size of triangle 1900:

```
#triangle-id3 {
    border-bottom: 30px;
    border-left: 10px;
    border-right: 10px;}
```

The following code represents the size of triangle 1910:

```
#triangle-id1 {
    border-bottom: 120px;
    border-left: 60px;
    border-right: 60px;}
```

The following code represents the size of triangle 1920:

```
#triangle-id2 {
    border-bottom: 80px;
    border-left: 40px;
    border-right: 40px;}
```

The following code represents the colors used by both triangles 1910 and 1920.

```
#triangle-style01 {
    border-bottom: solid green;
    border-left: solid transparent;
    border-right: solid transparent;}
```

From the above code it becomes clear that the code may be merged such that as many lines of code are shared between different shapes. In the example of FIG. 16, all triangles 1900, 1910 and 1920 share one CSS class, while triangles 1910 and 1920 further share another CSS class (i.e., the class defining the colors).

FIG. 17 shows a rounded square 1950. In the following, the successive creation of a web browser specific CSS class in accordance with an embodiment of the present invention is explained.

Initially, a basic rounded square class is created, which could be represented by the following code:

```
#rounded_square {
    margin:0;
    border: solid 1px;
    border-radius: 10px;
}
```

In a second step, a style specific class is created. As explained above, the class may be reused by other shapes as needed. As an example, this class could be represented by the following code:

```
#rounded_square_style01{
    background-color:#344567;
```

```
    border: solid 2px dark-blue
}
```

In a third step, an instance specific class is created defining the size of the shape:

```
#rounded_square_id01{
    width: 100px;
    height: 100px;
    border-radius: 20px;
}
```

However, as explained above, not all web browsers support all commands in the same way. Therefore, some commands have to be defined in a web browser specific way. Depending on the web browser, this could be represented by the following code:

```
#rounded_square_id01_ff7{
    -moz-border-radius:20px;
}
```

Finally, all created classes are assigned to the <div> element corresponding to the shape.

A more complex, but illustrative example is shown in FIG. 18. The symbol comprises three different shapes, a rounded square 2000, a circle 2010 and a triangle 2020. In this example, all shapes are of different type, size and have different border colors, but use exactly the same color gradient. After creation of all CSS classes (according to any embodiment described herein), the generator evaluates all class styles in order to determine common and reusable definitions. The reusable definitions are then extracted and put in separate classes.

The following code represents a portion of the style of the rounded square 2000:

```
#rounded_square_style01{
    ... // some other definitions
    background: linear-gradient(top, #1e5799 0%,#2989d8
    50%,#207cca 51%,#7db9e8 100%);
}
```

The circle 2010 may be represented by the following code:

```
#circle_style01{
    ... // some other definitions
    background: linear-gradient(top, #1e5799 0%,#2989d8
    50%,#207cca 51%,#7db9e8 100%);
}
```

The triangle 2020 may be represented by the following code:

```
#triangle_style01{
    ... // some other definitions
    background: linear-gradient(top, #1e5799 0%,#2989d8
    50%,#207cca 51%,#7db9e8 100%);
}
```

As can be seen from the code, and as explained above, all three shapes share the same color gradient. Thus, the respective code may be extracted and put into a new CSS style file comprising the common style feature:

```
#common_style01{
    background: linear-gradient(top, #1e5799 0%,#2989d8
    50%,#207cca 51%,#7db9e8 100%);
}
```

In this way, the amount of source code required to represent this common portion of the style of the three different shapes is reduced.

The symbol of FIG. 19 is a combination of three shapes: one rectangle 2500 and two circles 2510, 2520. In this example, the rectangle shape 2500 may have a blue gradient. Circle shape 2520 also has a blue gradient and circle shape 2510 has a "cutout style" and is filled with grey color. The following definition is necessary to define the symbol in the symbol language according to an embodiment of the present invention:

```
<symbol>
<rectangle
width="150px" height="150px"
embossed-style="true"
border-radius="( 20px, 20px)"
fill="" gradient(start(middle, top), stop(middle,
bottom), rgba(45, 157, 205, 0), rgba(0, 182, 241,
0))"
>
<circle
width="90px" height="90px" x="30px", y="30px"
fill="rgb(136, 136, 136, 0)"
cutout-style="true"
>
<circle
width="60px" height="60px" x="15px", y="15px"
embossed-style="true"
fill="" gradient(start(middle, top), stop(middle,
bottom), rgba(45, 157, 205, 0), rgba(0,
182, 241, 0))"
/>
</circle>
</rectangle>
</symbol>
```

Following code will be generated by the transformation framework according to an embodiment of the present invention:

```
<!DOCTYPE html>
<html>
<head>
<meta http-equiv="Content-Type" content="text/html;
charset=UTF-8">
<style>
.shape1 {
-webkit-box-shadow: inset 0 0 2px rgba(0,0,0,.8),
inset 0 2px 0 rgba(255,255,255,.5), inset 0 -7px 0
rgba(0,0,0,.6),
inset 0 -9px 0 rgba(255,255,255,.3);
-moz-box-shadow: inset 0 0 2px rgba(0,0,0,.8), inset
0 2px 0 rgba(255,255,255,.5), inset 0 -7px 0
rgba(0,0,0,.6), inset
0 -9px 0 rgba(255,255,255,.3);
box-shadow: inset 0 0 2px rgba(0,0,0,.8), inset 0 2px
0 rgba(255,255,255,.5), inset 0 -7px 0
rgba(0,0,0,.6), inset 0 -
9px 0 rgba(255,255,255,.3);
-webkit-border-radius: 20px;
-moz-border-radius: 20px;
border-radius: 20px;
background: -webkit-gradient(linear, 0% 0%, 0% 100%,
from(#2D9DCD), to(#00B6F1));
background: -moz-linear-gradient(top, #2D9DCD 0%,
#00B6F1 100%);
}
.shape2 {
-webkit-box-shadow: inset 0 0 2px rgba(0,0,0,.8),
inset 0 2px 0 rgba(255,255,255,.5), inset 0 -7px 0
rgba(0,0,0,.6),
inset 0 -9px 0 rgba(255,255,255,.3);
-moz-box-shadow: inset 0 0 2px rgba(0,0,0,.8), inset
0 2px 0 rgba(255,255,255,.5), inset 0 -7px 0
rgba(0,0,0,.6), inset
0 -9px 0 rgba(255,255,255,.3);
box-shadow: inset 0 0 2px rgba(0,0,0,.8), inset 0 2px
0 rgba(255,255,255,.5), inset 0 -7px 0
rgba(0,0,0,.6), inset 0 -
9px 0 rgba(255,255,255,.3);
-webkit-border-radius: 30px;
-moz-border-radius: 30px;
border-radius: 30px;
background: #00B6F1;
}
.shape3 {
-webkit-box-shadow: 0 1px 0 rgba(255,255,255,.2),
inset 0 4px 5px rgba(0,0,0,.6), inset 0 1px 0
rgba(0,0,0,.6);
-moz-box-shadow: 0 1px 0 rgba(255,255,255,.2), inset
0 4px 5px rgba(0,0,0,.6), inset 0 1px 0
rgba(0,0,0,.6);
box-shadow: 0 1px 0 rgba(255,255,255,.2), inset 0 4px
5px rgba(0,0,0,.6), inset 0 1px 0 rgba(0,0,0,.6);
-webkit-border-radius: 30em;
-moz-border-radius: 30em;
border-radius: 30em;
background: #888;
}
</style>
</head>
<body>
<div>
<div class="shape1" style="position:relative;
display:inline-block; width: 150px; height: 150px;">
<div class="shape3" style="position:relative; top:
30px; left: 30px; width: 90px; height: 90px;">
<div class="shape2" style="position:relative; top:
17px; left: 16px;
width: 60px; height: 60px;">
</div>
</div>
</div>
</div>
</body>
</html>
```

The difference in the complexity between the symbol language and the resulting HTML/CSS representation becomes immediately clear. This illustrates the advantageous solution of the present invention.

The following is an example of a tablet computer symbol. A graphic representation of this symbol is shown in FIG. 20. The symbol comprises a rectangle shape 2600 with a "card style", wherein the color changes from grey to white. Further, there is a rectangle shape 2610 in "cutout style" which is filled with grey color and a rectangle shape 2620 with "glossy style" and with no color filling. Finally, the symbol comprises a small rectangle shape 2630 in "cutout style" with grey filling. The following definition is necessary to define the symbol:

```
<symbol>
<rectangle
width="150px" height=" 200pxpx"
card-style="true"
border-radius="( 20px, 20px)"
```

```
            fill=" gradient(start(middle, top), stop(middle,
            bottom), rgba(187, 187, 187, 0), rgba(204, 204, 204,
            0))"
            >
            < rectangle
            width="90px" height="140px" x="25px", y="30px"
            fill="rgb(136, 136, 136, 0)"
            cutout-style="true"
            >
            < rectangle
            width="84px" height=" 135px" x="5px", y="3px"
            glossy ="rgba(255,255,255,0) simple"
            />
            </ rectangle >
            < rectangle
            width="20px" height=" 10px" x="60px", y="40px"
            cutout-style="true"
            border-radius="( 20px, 20px)"
            />
            </rectangle>
            </symbol>
```

The generation of several symbols can be optimized by reusing the generated CSS classes for different symbols. For instance, in the case where two symbols contain similar shapes, the generated CSS code can be generalized so that not two different CSS definitions are necessary for the shapes.

It has been shown above that the present invention provides for a user-friendly easy solution for creating HTML/CSS representations of complex symbols.

Moreover, the present solution is also efficient in generating HTML/CSS code from underlying human readable code. For instance, a HTML document containing 3000 symbols such as FIG. 6 could be displayed almost without delay in a common web browser running on standard hardware. This makes it possible to use this technology to represent big and complex models in the most common web browsers.

It will be appreciated that as used herein, the terms system, subsystem, service, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate non-transitory tangible computer readable storage medium. It also will be appreciated that the techniques described herein may be accomplished by having at least one processor execute instructions that may be tangibly stored on a non-transitory computer readable storage medium. Similar statements apply with respect to the clients, servers, and/or other elements in the various networks discussed herein.

What is claimed is:

1. A method for creating a HTML/CSS representation of a geometric symbol, the method comprising:
   a. processing a symbol definition from a file;
   b. creating a web browser specific shape CSS class for each geometric shape comprised in the symbol definition;
   c. generating the HTML/CSS representation comprising the one or more created web browser specific shape CSS classes;
   d. wherein the creating further comprises determining equal attributes for each of the shapes and merging the equal attributes into a generic attribute CSS class; and
   e. creating a web browser specific attribute CSS class from the generic attribute CSS class.

2. The method according to claim 1, wherein (b) further comprises creating at least one web browser specific attribute CSS class for each of the geometric shapes.

3. The method according to claim 2, wherein, for a given geometric shape that includes shape information and specific attributes other than shape information, the corresponding created shape CSS class stores the shape information and the corresponding created web browser specific attribute CSS class stores the specific attributes other than the shape information.

4. The method according to claim 1, further comprising: determining the level of CSS support of the web browser and adjusting the creation of the web browser specific shape CSS classes accordingly.

5. The method according to claim 1, wherein the web browser specific shape CSS class is created from a generic shape CSS class.

6. The method according to claim 1, wherein the generating of the HTML/CSS representation comprises the generation of the HTML/CSS representations for a set of pre-defined web browsers and storing the set of HTML/CSS representations into a single file.

7. The method according to claim 1, wherein the symbol definition corresponds to a XML-compatible format.

8. The method according to claim 1, wherein the HTML/CSS representation comprises a HTML file which comprises the web browser specific shape CSS classes.

9. The method according to claim 1, wherein the creation of the HTML/CSS representation is carried out at a server which retrieves the symbol definition from a client, and wherein the server sends the created HTML/CSS representation to the client.

10. A non-transitory computer readable medium tangibly embodying machine executable instructions for causing at least one computer to perform a method according claim 1 when executed.

11. The method according to claim 1, wherein the symbol definition includes a given geometric shape more than once, and wherein only one shape CSS class is created for the given geometric shape as a result of (b).

12. A system for creating a HTML/CSS representation of a geometric symbol, comprising:
   a. a processing module configured to process a symbol definition from a file;
   b. a creation module configured to create a web browser specific shape CSS class for each geometric shape comprised in the symbol definition;
   c. a generation module configured to generate the HTML/CSS representation comprising the one or more created web browser specific shape CSS classes; and
   d. at least one processor configured to execute the processing module, the creation module and the generation module;
   wherein the creation module is further configured to determine equal attributes for each of the shapes and merge the equal attributes into a generic attribute CSS class; and
   wherein a web browser specific attribute CSS class is created from the generic attribute CSS class.

13. The system according to claim 12, wherein the creation module is further configured to create at least one web browser specific attribute CSS class for each of the geometric shapes.

14. The system according to claim 12, further comprising a symbol editor comprising a GUI usable for drawing a geometric symbol and further configured to store the geometric symbol in the file so the HTML/CSS representation can be generated.

15. A method for creating a HTML/CSS representation of a geometric symbol, the method comprising:
   processing a symbol definition from a file;
   creating one web browser specific shape CSS class for each different geometric shape comprised in the symbol definition;
   generating the HTML/CSS representation comprising the one or more created web browser specific shape CSS classes;
   wherein the creating further comprises determining equal attributes for each of the shapes and merging the equal attributes into a generic attribute CSS class; and
   creating a web browser specific attribute CSS class from the generic attribute CSS class.

* * * * *